United States Patent
Baji-Gál

(10) Patent No.: US 9,767,292 B2
(45) Date of Patent: Sep. 19, 2017

(54) SYSTEMS AND METHODS TO IDENTIFY SECURITY EXPLOITS BY GENERATING A TYPE BASED SELF-ASSEMBLING INDIRECT CONTROL FLOW GRAPH

(71) Applicant: Unexploitable Holdings LLC, Lancaster, PA (US)

(72) Inventor: János Baji-Gál, Gödöllö (HU)

(73) Assignee: Unexploitable Holdings LLC, Lancaster, PA (US)

( * ) Notice: Subject to any disclaimer, the term of this patent is extended or adjusted under 35 U.S.C. 154(b) by 0 days.

(21) Appl. No.: 15/289,500

(22) Filed: Oct. 10, 2016

(65) Prior Publication Data
US 2017/0103210 A1    Apr. 13, 2017

Related U.S. Application Data

(60) Provisional application No. 62/239,942, filed on Oct. 11, 2015.

(51) Int. Cl.
*G06F 21/00*    (2013.01)
*G06F 21/57*    (2013.01)
*G06F 21/52*    (2013.01)

(52) U.S. Cl.
CPC ............ *G06F 21/577* (2013.01); *G06F 21/52* (2013.01); *G06F 2221/033* (2013.01)

(58) Field of Classification Search
CPC ... G06F 21/577; G06F 21/52; G06F 2221/033
USPC ........................................................ 726/23
See application file for complete search history.

(56) References Cited

U.S. PATENT DOCUMENTS

| | | | |
|---|---|---|---|
| 6,912,201 B1 * | 6/2005 | Yoshida | H04J 3/0623 370/248 |
| 7,086,088 B2 | 8/2006 | Narayanan | |
| 7,281,268 B2 | 10/2007 | Hollander | |
| 7,552,477 B1 | 6/2009 | Satish | |
| 7,577,992 B2 | 8/2009 | Abadi | |
| 7,581,089 B1 | 8/2009 | White | |
| 7,631,249 B2 | 12/2009 | Borde | |
| 7,752,459 B2 | 7/2010 | Cowan | |
| 7,945,953 B1 | 5/2011 | Salinas | |

(Continued)

OTHER PUBLICATIONS

The PAX Team, What the future holds for PaX, Mar. 20, 2003, available at https://pax.grsecurity.net/docs/pax-future.txt.

(Continued)

*Primary Examiner* — Mahfuzur Rahman
(74) *Attorney, Agent, or Firm* — Chhabra Law Firm, PC

(57) ABSTRACT

Using various embodiments, methods and systems for computing a self-assembling indirect control flow graph based on one or more function types and function pointer types are described. In one embodiment the indirect control flow graph is computed by finding one or more function types and function pointer types in source code and/or binary code, computing one or more identifier tags for each type, classifying functions and function pointers based on the computed tags. In one embodiment, the classification tags can be used in a tag check based Control Flow Integrity system. In another embodiment, the classification tags can be used to convert indirect function calls into direct function calls. Yet in another embodiment, tag checks can be eliminated in a Control Flow Integrity system.

24 Claims, 6 Drawing Sheets

(56) References Cited

U.S. PATENT DOCUMENTS

| | | | |
|---|---|---|---|
| 8,037,526 | B1 | 10/2011 | Satish |
| 8,104,021 | B2 | 1/2012 | Erlingsson |
| 8,136,091 | B2 | 3/2012 | Erlingsson |
| 8,631,248 | B2 | 1/2014 | Cowan |
| 8,645,923 | B1 | 2/2014 | Satish |
| 8,689,201 | B2 | 4/2014 | van den Berg |
| 8,745,741 | B1 | 6/2014 | Tice |
| 8,762,928 | B2 | 6/2014 | Sharma |
| 9,026,859 | B1 | 5/2015 | Pike |
| 9,165,138 | B2 * | 10/2015 | Davidov ............... G06F 21/54 |
| 9,262,627 | B2 | 2/2016 | Komaromy |
| 2001/0013094 | A1 | 8/2001 | Etoh |
| 2003/0182572 | A1 | 9/2003 | Cowan |
| 2005/0166001 | A1 | 7/2005 | Conover |
| 2007/0285271 | A1 | 12/2007 | Erlingsson |
| 2008/0015808 | A1 * | 1/2008 | Wilson .................. G06F 21/51 |
| | | | 702/123 |
| 2008/0060077 | A1 | 3/2008 | Cowan |
| 2009/0144309 | A1 | 6/2009 | Escandell |
| 2012/0167120 | A1 | 6/2012 | Hentunen |
| 2013/0117843 | A1 | 5/2013 | Komaromy |
| 2013/0179869 | A1 | 7/2013 | Little |
| 2013/0185792 | A1 | 7/2013 | Balakrishnan |
| 2014/0020092 | A1 | 1/2014 | Davidov |
| 2014/0052971 | A1 | 2/2014 | Sehr |
| 2014/0075556 | A1 | 3/2014 | Wicherski |
| 2014/0082327 | A1 | 3/2014 | Ghose |
| 2014/0082329 | A1 | 3/2014 | Ghose |
| 2014/0096245 | A1 | 4/2014 | Fischer |
| 2014/0096247 | A1 | 4/2014 | Fischer |
| 2014/0123281 | A1 | 5/2014 | Fischer |
| 2014/0123286 | A1 | 5/2014 | Fischer |
| 2014/0156972 | A1 | 6/2014 | Shanbhogue |
| 2014/0283040 | A1 | 9/2014 | Wilkerson |
| 2014/0283060 | A1 | 9/2014 | Beatty |
| 2014/0298300 | A1 | 10/2014 | Rhee |
| 2014/0344932 | A1 | 11/2014 | Polychronakis |
| 2014/0372701 | A1 | 12/2014 | Komaromy |
| 2015/0095617 | A1 | 4/2015 | Shanbhogue |
| 2015/0095628 | A1 | 4/2015 | Yamada |
| 2015/0113640 | A1 | 4/2015 | Krten |
| 2015/0128265 | A1 | 5/2015 | Jover |
| 2015/0128266 | A1 | 5/2015 | Tosa |
| 2015/0135313 | A1 | 5/2015 | Wesie |
| 2015/0278116 | A1 | 10/2015 | Caprioli |
| 2015/0278513 | A1 | 10/2015 | Krasin |
| 2015/0278516 | A1 | 10/2015 | Caprioli |
| 2015/0356294 | A1 | 12/2015 | Tan |
| 2015/0370560 | A1 | 12/2015 | Tan |

OTHER PUBLICATIONS

Martin Abadi, Control-Flow Integrity: Principles, Implementations, and Applications, Nov. 1, 2004, available at http://csd.uoc.gr/~hy558/reports2016/vardas/CFI.pdf.

Chen, Defeating Memory Corruption Attacks via Pointer Taintedness Detection, Dependable Systems and Networks, 2005, available at http://ieeexplore.ieee.org/document/1467812/.

McCamant, Efficient, Verifiable Binary Sandboxing for a CISC Architecture, 2005, available at https://people.csail.mit.edu/smcc/projects/pittsfield/.

Chen, Non-Control-Data Attacks Are Realistic Threats, USENIX Security Symposium, 2005, available at https://www.microsoft.com/en-us/research/publication/non-control-data-attacks-are-realistic-threats/.

Abadi, A Theory of Secure Control Flow, 2005, available at http://www.cse.usf.edu/~ligatti/papers/MSR-TR-2005-17.pdf.

Abadi, Control-Flow Integrity, 2005, available at http://www.cse.usf.edu/~ligatti/papers/MSR-TR-2005-18.pdf.

McCamant, Evaluating SFI for a CISC Architecture, USENIX Security Symposium, 2006, available at http://groups.csail.mit.edu/pag/pubs/pittsfield-usenix2006.pdf.

Castro, Securing software by enforcing data-flow integrity, USENIX Symposium on Operating Systems Design and Implementation, 2006, available at http://research.microsoft.com/en-us/um/people/mcastro/publications/dfiOSDI.pdf.

Erlingsson, XFI: Software Guards for System Address Spaces, USENIX Symposium on Operating Systems Design and Implementation, 2006, available at https://cseweb.ucsd.edu/~mvrable/papers/2006-osdi-xfi.pdf.

Crandall, Minos: Architectural Support for Protecting Control Data, ACM Transactions on Architecture and Code Optimization, 2006, available at https://www.cs.unm.edu/~crandall/p359-crandall.pdf.

Younan, Extended protection against stack smashing attacks without performance loss, Proceedings of the 22nd Annual Computer Security Applications Conference, 2006, available at https://www.acsac.org/2006/papers/43.pdf.

Nanda, Foreign Code Detection on the Windows/X86 Platform, Proceedings of the 22nd Annual Computer Security Applications Conference, 2006, available at https://www.acsac.org/2006/papers/86.pdf.

Younan, Efficient protection against heap-based buffer overflows without resorting to magic, Proceedings of the 8th international conference on Information and Communications Security, 2006, available at http://dl.acm.org/citation.cfm?id=2092912.

Younan, Protecting global and static variables from buffer overflow attacks, Proceedings of the 3rd International Workshop on Secure Software Engineering, 2009, available at http://www.fort-knox.org/files/globstat.pdf.

Kumar, Harbor: Software-based Memory Protection for Sensor Nodes, Proceedings of the 6th international conference on Information processing in sensor networks, 2009, available at http://read.seas.harvard.edu/~kohler/pubs/kumar07harbor.pdf.

Park, An Efficient Hardware Support for Control Data Validation, Proceedings of IEEE 18th International Conference on Application-specific Systems, Architectures and Processors, 2007, available at http://home.eng.iastate.edu/~zzhang/publications/tr07-asap-cfi.pdf.

Carlini, Control Flow Bending: On the Effectiveness of Control Flow Integrity, USENIX Security Symposium, 2015, available at https://www.ethz.ch/content/dam/ethz/special-interest/infk/inst-cs/1st-dam/documents/Publications/USENIXSEC_2015.pdf.

Abadi, Control-Flow Integrity Principles, Implementations, and Applications, ACM Transactions on Information and System Security, 2009, available at https://users.soe.ucsc.edu/~abadi/Papers/cfi-tissec-revised.pdf.

Rota, Off-Chip Control Flow Checking of On-Chip Processor-Cache Instruction Stream, IEEE International Symposium on Defect and Fault Tolerance in VLSI Systems, 2006, available at http://derric1.people.uic.edu/Website_MURI_RF/Publications_Canta/dft06.pdf.

Sadeghi, Securing Legacy Software against Real-World Code-Reuse Exploits: Utopia, Alchemy, or Possible Future?, Proceedings of the 10th ACM Symposium on Information, Computer and Communications Security, 2015, available at http://dl.acm.org/citation.cfm?id=2737090.

Petroni, Automated Detection of Persistent Kernel Control-Flow Attacks, ACM Conference on Computer and Communications Security, 2007, available at https://www.cs.umd.edu/~mwh/papers/petroni07sbcfi.html.

Healey, Dynamic Tracking of Information Flow Signatures for Security Checking, 2007, available at http://impact.crhc.illinois.edu/shared/report/Security.Checking07.pdf.

Erlingsson, Low-Level Software Security: Attacks and Defenses, Foundations of Security Analysis and Design IV, 2007, available at http://link.springer.com/chapter/10.1007%2F978-3-540-74810-6_4.

Criswell, KCoFI: Complete Control-Flow Integrity for Commodity Operating System Kernels, Proceedings of the 2014 IEEE Symposium on Security and Privacy, 2014, available at http://sva.cs.illinois.edu/pubs/KCoFI-Oakland-2014.pdf.

Akritidis, Preventing memory error exploits with WIT, Proceedings of the 2008 IEEE Symposium on Security and Privacy, 2008, available at https://www.doc.ic.ac.uk/~cristic/papers/wit-sp-ieee-08.pdf.

(56) References Cited

OTHER PUBLICATIONS

Zhang, Practical Control Flow Integrity and Randomization for Binary Executables, Proceedings of the 2013 IEEE Symposiumon Security and Privacy, 2013, available at http://seclab.cs.sunysb.edu/seclab/pubs/oak13.pdf.
Bhatkar, Data Space Randomization, Proceedings of the 5th international conference on Detection of Intrusions and Malware, and Vulnerability Assessment, 2008, available at http://dl.acm.org/citation.cfm?id=1428324.
Tice, Enforcing Forward-Edge Control-Flow Integrity in GCC & LLVM, USENIX Security Symposium, 2014, availabte at https://www.usenix.org/system/files/conference/usenixsecurity14/sec14-paper-tice.pdf.
Wang, Countering Persistent Kernel Rootkits Through Systematic Hook Discovery, Proceedings of the 11th international symposium on Recent Advances in Intrusion Detection, 2008, available at https://www.microsoft.com/en-us/research/wp-content/uploads/2016/02/hookmap-raid08.pdf.
Bratus, Traps, Events, Emulation, and Enforcement: Managing the Yin and Yang of Virtualization-based Security, Proceedings of the 1st ACM workshop on Virtual machine security, 2008, available at http://www.cs.dartmouth.edu/~sws/pubs/yinyang.pdf.
Baliga, Automatic Inference and Enforcement of Kernel Data Structure Invariants, Proceedings of the 2008 Annual Computer Security Applications Conference, 2008, available at http://www.cs.rutgers.edu/~iftode/gibraltar08.pdf.
Joao, Leveraging Optimization Methods for Dynamically Assisted Control-Flow Integrity Mechanisms, IEEE 26th International Symposium on Computer Architecture and High Performance Computing, 2014, available at http://ieeexplore.ieee.org/document/6970646/.
Wei, Soft-Timer Driven Transient Kernel Control Flow Attacks and Defense, Annual Computer Security Applications Conference, 2008, available at https://www.acsac.org/openconf2008/modules/request.php?module=oc_program&action=view.php&id=143.
Yee, Native Client: A Sandbox for Portable, Untrusted x86 Native Code, IEEE Symposium on Security and Privacy, 2009, available at http://static.googleusercontent.com/media/research.google.com/en//pubs/archive/34913.pdf.
Yang, Eliminating the Call Stack to Save RAM, Proceedings of the 2009 ACM SIGPLAN/SIGBED conference on Languages, compilers, and tools for embedded systems, 2009, available at https://www.cs.utah.edu/~regehr/papers/lctes062-yang.pdf.
Kumar, A System for Coarse Grained Memory Protection in Tiny Embedded Processors, Proceedings of the 44th annual Design Automation Conference, 2007, available at http://www.read.seas.harvard.edu/~kohler/pubs/kumar07system.pdf.
Mao, Hardware Support for Secure Processing in Embedded Systems, Proceedings of the 44th annual Design Automation Conference, 2007, available at http://dl.acm.org/citation.cfm?id=1278605.
Criswell, Memory Safety for Low-Level Software/Hardware Interactions, USENIX Security Symposium, 2009, available at http://llvm.org/pubs/2009-08-12-UsenixSecurity-SafeSVAOS.pdf.
Hund, Return-Oriented Rootkits: Bypassing Kernel Code Integrity Protection Mechanisms, USENIX Security Symposium, 2009, available at https://www.usenix.org/legacy/event/sec09/tech/full_papers/hund.pdf.
Castro, Fast Byte-Granularity Software Fault Isolation, Proceedings of the ACM SIGOPS 22nd symposium on Operating systems principles, 2009, available at http://www.sigops.org/sosp/sosp09/papers/castro-sosp09.pdf.
Coudray, Picon: Control Flow Integrity on LLVM, Symposium sur la sécurité des technologies de l'information et des communications, 2015, available at https://www.ssi.gouv.fr/uploads/2015/06/SSTIC2015-Article-control_flow_integrity_on_llvm_ir-fontaine_chiffiier_coudray_esfrDAI.pdf.
Francillion, Defending Embedded Systems Against Control Flow Attacks, Proceedings of the first ACM workshop on Secure execution of untrusted code, 2009, available at http://s3.eurecom.fr/docs/secucode09_francillon.pdf.
Wang, FPValidator: Validating Type Equivalence of Function Pointers on the Fly, Annual Computer Security Applications Conference, 2009, available at https://www.acsac.org/2009/openconf/modules/request.php?module=oc_program&action=view.php&id=204.
Gadaleta, Instruction-level countermeasures against stack-based buffer overflow attacks, Proceedings of the 1st EuroSys Workshop on Virtualization Technology for Dependable Systems, 2009, available at http://www.fort-knox.org/files/qemu_retaddr_countm.pdf.
Davi, Dynamic Integrity Measurement and Attestation: Towards Defense Against Return-Oriented Programming Attacks, Proceedings of the 2009 ACM workshop on Scalable trusted computing, 2009, available at http://www.trust.ruhr-uni-bochum.de/media/trust/veroeffentlichungen/2010/05/19/DaSaWi2010-towards_dynima.pdf.
Checkoway, Escape From Return-Oriented Programming: Return-oriented Programming without Returns (on the x86), Proceedings of the 17th ACM conference on Computer and communications security, 2010, available at https://cseweb.ucsd.edu/~hovav/dist/noret.pdf.
Shacham, The Geometry of Innocent Flesh on the Bone: Return-into-libc without Function Calls (on the x86), Proceedings of the 14th ACM conference on Computer and communications security, 2007, available at https://cseweb.ucsd.edu/~hovav/dist/geometry.pdf.
Wang, HyperSafe: A Lightweight Approach to Provide Lifetime Hypervisor Control-Flow Integrity, Proceedings of the 2010 IEEE Symposium on Security and Privacy, 2010, available at https://www.csc.ncsu.edu/faculty/jiang/pubs/OAKLAND10.pdf.
Younan, PAriCheck: An Efficient Pointer Arithmetic Checker for C Programs, Proceedings of the 5th ACM Symposium on Information, Computer and Communications Security, 2010, available at http://www.fort-knox.org/files/paricheck.pdf.

\* cited by examiner

SYSTEMS AND METHODS TO IDENTIFY SECURITY EXPLOITS BY GENERATING A TYPE BASED SELF-ASSEMBLING INDIRECT CONTROL FLOW GRAPH

CROSS REFERENCE TO RELATED APPLICATIONS

The present application claims priority from U.S. Provisional Patent Application No. 62/239,942, titled, "Type Based Self-Assembling Indirect Control Flow Graph," filed on Oct. 11, 2015, under 35 U.S.C. 119(e), the contents of the above mentioned provisional patent application is incorporated herein by reference, for all purposes to the extent that such subject matter is not inconsistent herewith.

FIELD OF THE INVENTION

Embodiments of the present invention relates generally to protecting computer systems from memory related security exploits and improving their performance. More particularly, embodiments of the invention relate to preventing security exploits during run-time of a software program or application.

BACKGROUND OF THE INVENTION

Memory related corruption, that is, memory modification or disclosure can result in unintended consequences and/or abuse in a software program. Manipulation (exploitation) of memory data during execution of a software program can result in privilege abuse or escalation in the program. Since privilege abuse and escalation are fundamental steps during hacking of computer systems, prevention of exploitation of memory corruption is an important task.

A Control Flow Graph (CFG) of a program is a construct used in many kinds of software tools such as compilers, binary rewriters, runtime binary instrumentation engines, binary translator engines, runtime code generators and other software tools. The CFG describes the software execution path as intended by the programmer. It contains vertices corresponding to the source and destination instructions of control flow transfers in the program and directed edges between a valid source and destination pair. Conventionally, the CFG can be defined by analysis, such as, source-code based analysis, intermediate representation based analysis, binary analysis, or execution profiling. A CFGs can have a direct control flow graph, that is, a construct representing the direct flow of function calls, and an indirect control flow graph, (ICFG), that is, a construct representing in direct calls, indirect jumps, function returns, signal delivery, exception delivery and other forms of indirect control flow. For computer security and/or performance optimization purposes indirect control flow of a program can expose vulnerabilities or efficiency related issues in the program.

For instance, an exemplary use of the ICFG for computer security purposes is the tag based fine-grained Control Flow Integrity (FG-CFI) method. FG-CFI is the state of also known in the art as return-oriented programming (ROP), return-into-library based attack or jump-oriented programming (JOP), counterfeit object-oriented programming (COOP) or other variants. FG-CFI is a transformation method that protects indirect control transfers in the form of indirect calls, indirect jumps, and returns by tagging control transfers and valid destinations with identifier values, and further inserting tag checks before indirect control transfers, and further detecting and reacting to tag mismatches at runtime. In FG-CFI a first pair of control transfer and valid destination is assigned a unique identifier that is different from the identifier of a second pair of control transfer and valid destination if and only if the control transfer of the first pair is different from the control transfer of the second pair and if the valid destination of the first pair is different from the valid destination of the second pair.

Another exemplary use of the ICFG for performance optimization purposes is a transformation method that converts indirect function calls into direct function calls. In particular, if it can be determined that based on the ICFG an indirect call or indirect jump has only one valid target then such indirect call or indirect jump can be transformed into a direct call or direct jump which improves performance by eliminating erroneous branch predictions and/or helping speculative execution in the processor at runtime.

One particular use of this transformation is known in the art as devirtualization that converts virtual class member function calls into direct class member function calls. Another aspect of this transformation further reduces the performance impact of FG-CFI. In particular, by design FG-CFI does not insert tag checks for direct control flow graphs which can be transformed into direct function calls.

It is important that the ICFG be as complete and correct as possible. In particular, if the ICFG is missing one or more vertices and/or edges then it may result in incorrectly converting an indirect call into a direct one which in turn may result in incorrect program behavior and in omitting an otherwise needed tag check in an FG-CFI method. If the ICFG has false vertices and/or edges then it can result in not converting an indirect call into a direct call or it can cause the insertion of an otherwise unnecessary tag check in an FG-CFI method.

Constructing a correct and complete ICFG for a program is not a trivial task. To generate an ICFG conventional methods such as Link Time Optimization (LTO), Link Time Code Generation (LTCG), Whole Program Analysis (WPA) or Class Hierarchy Analysis (CHA) require the analysis of all the code that constitutes the program and all its dependent libraries. However, these conventional methods do not scale to complex software such as entire operating systems or web browsers. Another limitation of conventional methods is that they are unable to generate ICFGs in a dynamically loaded code environment and/or require to statically link the program to construct the ICFG or require complexity that may be impractical in runtime environment.

Thus, what is needed are methods, systems, and techniques that can efficiently generate a scalable ICFG that can overcome the above mentioned limitations. Furthermore, such methods, systems, and techniques should be able to operate in a dynamically loaded code environment without requiring to statically link the program to construct the ICFG.

SUMMARY OF THE DESCRIPTION

The present invention describes techniques to generate systems and methods to construct a type based self-assembling ICFG (TB-SA-ICFG) that can generate an ICFG without the analysis of all the code, including dependent libraries, of a program. The TB-SA-ICFG, in one embodiment, is able to scale to complex software, including entire operating systems and browsers. In another embodiment, the TB-SA-ICFG can be generated in a dynamically loaded code environment and does not require static linking the program to construct the ICFG.

The TB-SA-ICFG systems and methods may be implemented on a computing system that includes processors, system memory, input/output (I/O) structures, a user interface, and connections between these components. The improved systems may also be connected to one or more servers for carry out one or more steps of the methods of the present invention. The TB-SA-ICFG systems and methods may be implemented on devices, Internet of Things devices, desktop computers, satellites and space-based systems, servers and other computing devices.

In one embodiment, to construct a TB-SA-ICFG, involves assigning one or more tags to each indirect control transfer and valid destination in a program. These tags can be used as identifier tags in an FG-CFI method and/or they can be used to convert indirect control transfers into direct control transfers. The vertices of the TB-SA-ICFG represent the vertices of a conventional ICFG. In one embodiment, the TB-SA-ICFG can have a directed edge between a first control transfer vertex and a first valid destination vertex if at least one tag value assigned to the first control transfer vertex is identical to at least one tag value assigned to the first valid destination vertex.

As described herein, in one embodiment, TB-SA-ICFG based systems do not require the generation of a conventional ICFG. Although, for illustrative purposes only, the invention described herein implements TB-SA-ICFG based techniques using a compiler, however, it should be noted TB-SA-ICFG based techniques described herein are not limited to be implemented via a compiler, runtime dynamic binary instrumentation, runtime code generation or via static binary rewriting or binary translation or other similar methods. In one embodiment, TB-SA-CFG systems and methods can reduce the performance impact of indirect control transfers by converting them to direct control transfers. Further, the TB-SA-ICFG systems and methods can reduce the performance impact of conventional FG-CFI methods by not instrumenting indirect control transfers that can be converted to direct control transfers. In one embodiment, TB-SA-ICFG based systems can improve the security level of conventional FG-CFI methods by providing a fine grained tag based classification for control transfers and their valid destinations.

In one embodiment, the techniques described herein can improve conventional optimization techniques such as devirtualization and other similar methods that convert indirect control transfers into direct control transfers by finding more candidate indirect control transfers for said conversion that conventional techniques are unable to identify. In one embodiment, a TB-SA-ICFG based implementation can reduce the performance impact of conventional Fine-Grained Control Flow Integrity (FGCFI) methods by not instrumenting indirect control transfers that can be converted to direct control transfers. Further, the techniques described herein can improve the security level of conventional FG-CFI methods by providing a fine grained tag based classification for control transfers and their valid destinations.

In one embodiment, a method includes identifying a vertex of an ICFG of a program where the vertex represents a function or call to a function of a program. The method further includes computing a first type for the data structure, the first type comprises at least one of a second type of a return value, a function name, or a third type of a parameter. The method includes computing at least one tag value from the first type for the function or call to a function represented by the vertex. The one or more parts of the first type computed for the represented data structure can be used in the tag computation depend on the type of the data structure as described further herein.

In one embodiment, the tag value is computed during compilation of the source code. After computing the tag value, in one embodiment, the computed tag is embedded within the instructions for execution during compilation of the source code. Thereafter, during run-time or code execution of the compiled program, the tag value is compared to the tag value stored at the address location of the targeted function. If the values are determined not to be the same, then it is presumed that a security exploit was attempted and necessary steps, as known to a person of ordinary skill in the art, can be taken to prevent and/or report the attempted security exploit.

For computing a tag value from the one or more parts of a type, any technique can be used that maps one or more sequences of bits of arbitrary length to a sequence of bits of bounded length, as known to a person of ordinary skill in the art. Examples includes computing a unique value based on the type of the function being called during code execution using techniques like computing a hash value, cryptographic hash value, memory compare a sequence of bits, etc. A person of ordinary art in the skill would appreciate that many other techniques to compute a unique value for each function can be employed.

In one embodiment, a method and system are provided to identify security exploits in a software program implemented by a computer system using the techniques described herein. The method includes reading into memory the software program (e.g., source code, binary, etc.) and identifying a first vertex of an ICFG of the software program. In one embodiment, the first vertex of the ICFG represents an indirect function call instruction, through a function pointer, in memory, to at least a first function in the software program. In one embodiment, the first vertex can also represent an indirect call machine instruction, in memory, from where control flow can be redirected to an unintended or malicious instruction stored in memory. The method further includes identifying a second vertex of the ICFG of the source code, the second vertex representing a memory location where a machine instruction of a function of the software program resides (in memory). The method includes determining a type signature for the first vertex. In one embodiment, the type signature of the first vertex can include at least a type of a return value expected by the call or a type of a parameter provided to the function through the call. The method also determines a type signature for the second vertex, the type of the second vertex including at least a type of a return value of the function or a type of a parameter of the function. Tag values are computed for the type signatures of the first and second vertices. In one embodiment, the tag values are computed by a function, known to a person of ordinary skill in the art, that can map one or more sequences of bits of arbitrary length to a sequence of bits of bounded length. In one embodiment, the function can be at least be one of a hash function, a memory compare function, or a cyclic redundancy check function. In one embodiment, at least one computed tag value is inserted into a memory location that is associated with each vertex. As referred herein, a memory location that stores a tag value is said to be associated with a vertex if the tag value was computed for that vertex. In a preferred embodiment, the tag values associated with at least the first or second vertices can be stored at a predetermined offset memory location from the indirect function call and/or the function. In one embodiment, the predetermined offset can be determined based on the length of the tag value. For example, if the tag value is computed to be an 8 byte value, then, in one embodiment, the tag value can be injected at an 8 byte offset memory location from the function call and/or the function during compilation of the source code.

Thereafter, the tag values associated with each of the first and second vertices are compared during execution of the software program. To identify security exploits, the method can determine whether the computed tag values of the first and second vertices are different. That is, if the tag values of the function call (represented by the first vertex) and the function (represented by the second vertex) are different then it can be determined that a security exploit has occurred. In such an event, security protocols can be executed by the program, compiler, and/or the system to prevent the further execution of the instruction code of the software program. If, however, the tag values of the function call and the function are determined to be the same, then it can be determined that a proper call to the function was made by the function call and control flow proceeds to the instruction, as requested by the function call.

In one embodiment, when the function call represented by the first vertex is to a virtual class member function or the function represented by the second vertex is to a virtual class member function, the method further includes identifying an ancestor function of the virtual class member function (represented by the first and/or second vertex), the ancestor function being another virtual class member function that does not itself override any other virtual class member function. In one embodiment, the identifying information of the ancestor function can be included into the type signature of the first and/or second vertex.

In another embodiment, the class of the ancestor virtual function can be a base class of the encompassing class of the virtual class member function represented by the first and/or second vertex. Further, in this embodiment, a virtual function table index of the virtual class of the ancestor function can be the same as that of the virtual class member function of the first and/or second vertex. In one embodiment, the identifying information of the ancestor function included to the type signature of the first and/or second vertex can include at least a function name, an encompassing class name, an encompassing namespace name, or a mangled name.

In one embodiment, the method includes identifying a vertex of an ICFG of a program where the vertex is a return place after a control transfer to a function. The method includes computing a first type for the function where the first type includes at least one of a second type of a return value, a function name and a third type of a parameter. Thereafter, the method includes computing at least one tag value for the return place, and computing the at least one tag from the first type computed for the function. The one or more parts of the first type the function as described further herein.

In one embodiment, a method includes identifying a vertex of an ICFG of a program where the vertex is a function return. The method further includes computing a first type for the function wherein the first type comprises at least one of a second type of a return value, a function name and a third type of a parameter. The method further includes computing at least one tag value for the function return. The method further includes computing the at least one tag from the first type computed for the function. The one or more parts of the first type computed for the function that may be used in the tag computation depend on the kind of the function as described in detail below.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" or "another embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g., circuitry, dedicated logic, etc.), software, or a combination of both. Although the processes are described below in terms of some sequential operations, it should be appreciated that some of the operations described can be performed in a different order. Moreover, some operations can be performed in parallel rather than sequentially.

As used in the description, unless otherwise specified the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner. Also, the terms "bit," "flag," "field," "entry," "indicator," etc., may be used to describe any type of storage location in a register, table, database, or other data structure, whether implemented in hardware or software, but are not meant to limit or other elements within any particular storage location.

Throughout this disclosure, for illustrative purposes only, specific pseudo code examples in C, C++ and amd64 assembly (in AT&T syntax) have been used to explain the underlying concepts, although a person of ordinary skill in the art would appreciate that the techniques described herein can be implemented in any computer programming language. Although, C and C++ programs are built from functions that can call other functions either directly or indirectly, since only indirect calls and function returns are subject to CRA this disclosure describes innovative techniques to generate an ICFG of a CFG to at least identify security exploits and/or optimize code.

Figure 1:
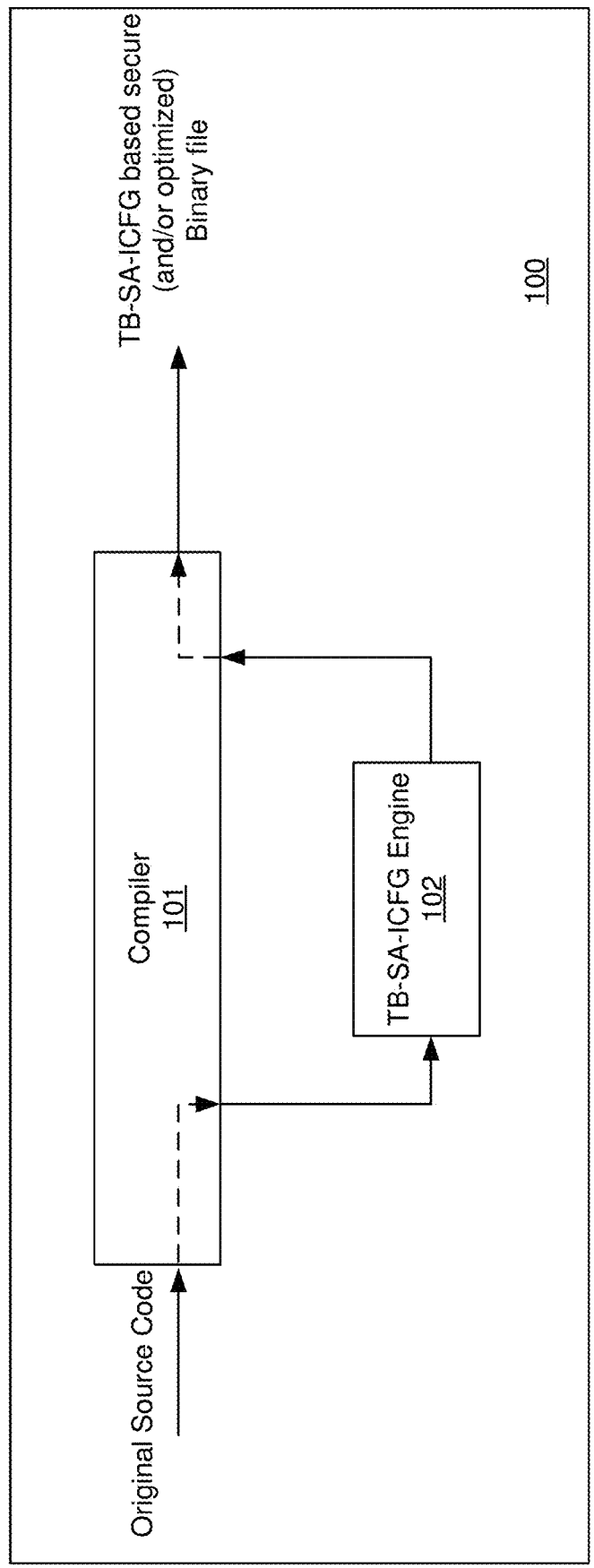
FIG. 1 illustrates a block diagram of a computer system implementing a TB-SA-ICFG based system, according to one embodiment of the present invention.

FIG. 1 illustrates a block diagram of a computer system implementing a TB-SA-ICFG based system, according to one embodiment of the present invention. Generally, in Code Reuse Attacks (CRA) the attacker's goal is to modify a code pointer to point it at some already existing code in memory to force the program to perform actions against the intended instruction sequence of the program code sequence that in turn when the program dereferences the hijacked code pointer. The invention described herein provides techniques to prevent CRAs by restricting a code pointer to executable memory of the intended target addresses only, thereby preserving Control Flow Integrity (CFI). To preserve CRAs, the invention, as described herein, identifies the intended target addresses for code pointers and enforces them at runtime. Thus, any violation to the enforcement, at run time, can be declared as an attack attempt and the rest of the program or system can react accordingly to such events, as known to a person of ordinary skill in the art.

The first task of identifying intended target addresses of code pointers can be accomplished by constructing a CFG (or at least an ICFG) of the program. However, this task can be challenging since in practice software programs tend to be modular (so the complete CFG/ICFG of a program is not known until it runs with all its runtime dependences loaded into memory, which can change from execution to execution). Further, depending on the implementation language, certain code constructs may be hard to analyze without human help and thus the resulting CFG/ICFG may not be precise enough. The second task builds on the CFG/ICFG (which may be precise or (over)approximated) and modifies the program at certain points (usually at dereferencing of code pointers) to verify at runtime that the about-to-be-dereferenced code pointer is actually a member of the intended target address set as defined by the CFG/ICFG. This can also be a challenging task since usually software programs execute many indirect control transfers via code pointers, and thus any extra instructions inserted there will have a proportional performance impact that can result in a very challenging task to meet a worst-case performance impact that results in a single-digit percentage slowdown. The invention disclosed herein, overcomes these shortcomings by implementing a TB-SA-ICFG.

As illustrated, compiler 101 of computer system 100 can receive source code of a software program. Compiler 101 can transmit the code to TB-SA-ICFG engine 102 to generate and/or implement a TB-SA-ICFG as describe herein. The disclosure herein describes the implementation of an approximation of the ICFG for a program (including any of its modules, dependencies, etc.) that in turn can be verified with acceptable performance impact at runtime. In one embodiment, using the techniques described herein, TB-SA-ICFG engine 102 can generate an approximated ICFG based on a 'type hash' (or any other unique identifier) computed for each type as declared in the high level source language. A unique identifier can be computed by TB-SA-ICFG Engine 102 as long as different types produce different hash values. Since the ICFG vertices are functions and indirect control transfers (function pointers and returns in C and C++), computing the type hash on function and function pointer types only can result in the generation of a TB-SA-ICFG to prevent CRAs. It should be noted, type hashes can also be computed on arbitrary types and implemented, in one embodiment, for other purposes other than CFI check/CRA prevention, as known to a person of ordinary skill in the art. Once an approximated ICFG is generated, the computed type hash values are inserted into the binary code of the software program by compiler 101.

As described herein, a 'data type' or 'type' refers to a classification identifying one or more of various types of data (e.g., real, integer, Boolean, character, pointer, etc.) that determines values for the type, valid operations that can be performed values of the type, the meaning of the data, and/or storage representation, in memory, of the value of the type.

In one embodiment, the innovative techniques described herein can be explained by the following pseudo code, showing a function and an indirect call to it via a function pointer having a data type:

```
void fi(int) { }
...
void fv(void) { }
...
void (*pfv)(void) = &fv;
...
pfv( );
...
fv( );
```

As can be seen by the above stated pseudo code, two functions fi and fv can be implemented with a function pointer call pfv to function fv, followed by a direct call to function fv. Similar control flow instructions can be implemented for function fi (not shown). At the assembly level the original unprotected pseudo code could look like this:

```
fi:
retq
...
fv:
retq
...
movq fv,%rax
...
callq *%rax
...
call fv
```

In one embodiment, the code above can be instrumented with the techniques described herein to compute a hash value for each function and inject the computed value for each function and function pointer during compilation of the source code. In this embodiment, the runtime check, in assembly pseudo code, could look like:

```
dq 0x23456789 ; type hash of the type void(int)
fi: ; label identifying the beginning of function fi
retq ; return from function fi
...
dq 0x12345678 ; type hash of the type void(void)
fv: ; label identifying the beginning of function fv
retq ; return from function fv
...
```

-continued

```
movq fv,%rax ; store the address of function fv into processor register
rax
...
cmpq -8(%rax),0x12345678 ; compare type hash for void(*)(void) with
the type hash stored at offset -8 from the address stored in
processor register rax
jne .attack_detected ; jump to error handling if a type hash mismatch
was detected
callq *%rax ; indirect call to the address stored in processor register rax
...
call fv ; direct call, no need to verify the type hash
```

Using the techniques described herein, the above example shows that the compiler can compute identical type hash values (as expected) for the matching function and function pointer types to recognize that no security exploitation was detected. As can be seen in the pseudo code above, in one embodiment, the type hash is stored at a fixed offset from the call instruction. Further, if the function pointer value was modified via an exploit then the attempt would be detected as long as the type hash value stored at offset -8 from the hijacked function pointer doesn't match the type hash value of the function pointer. In one embodiment, the computed type hash values are encoded in the machine instruction itself and are considered immutable.

Further, since only two machine instructions were needed per indirect call site in the example described above, the TB-SA-ICFG is both efficient at runtime and scales to large code bases (since the compiler can compute the type hashes based on information available in the current translation unit (TU), there will be no need to do cross-TU analysis as required by conventional methods stated earlier in this document).

Figure 2:
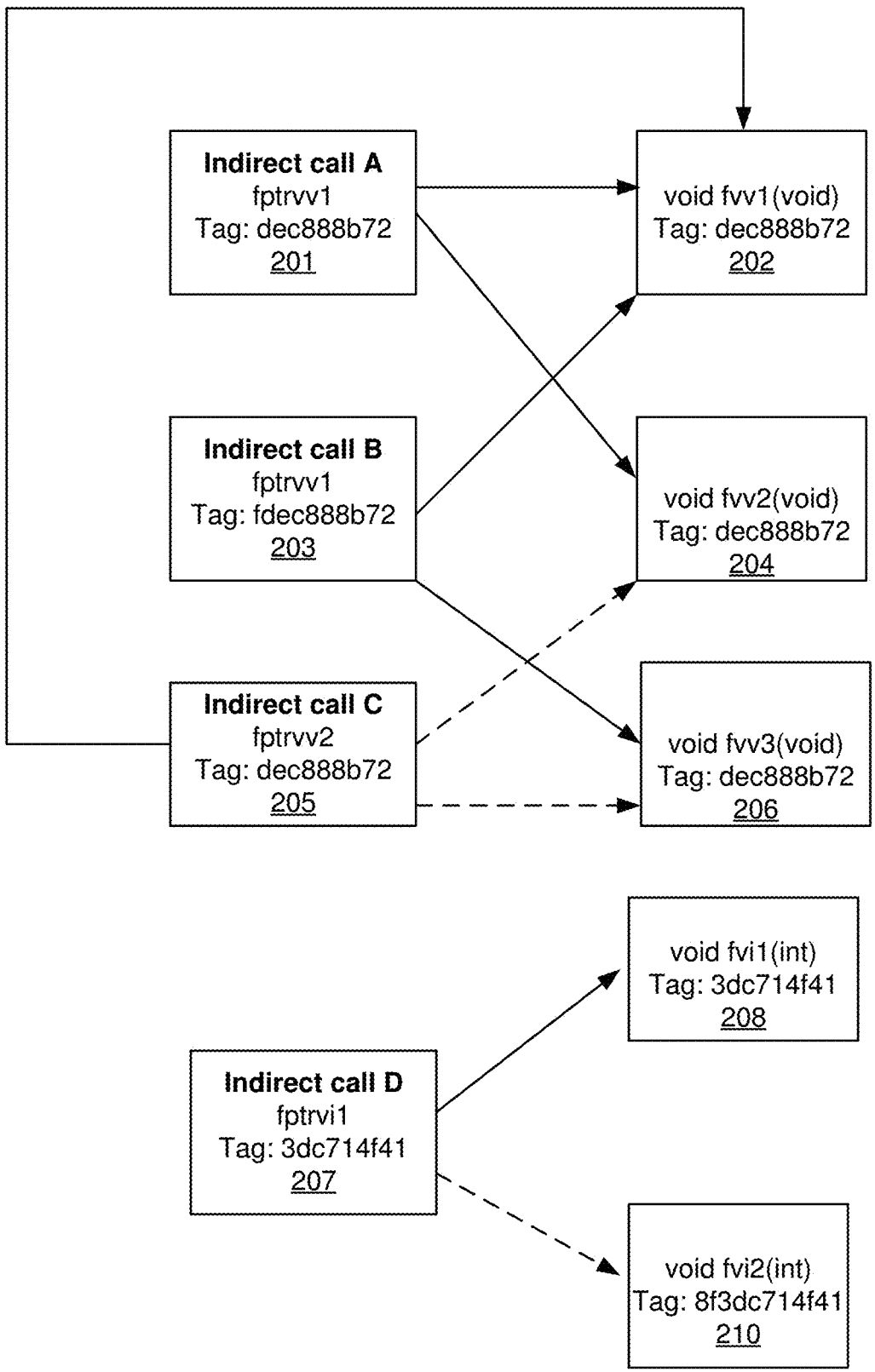
FIG. 2 illustrates a block diagram of a TB-SA-ICFG, according to an embodiment of the present invention.

FIG. 2 illustrates a block diagram of a TB-SA-ICFG, according to an embodiment of the present invention for the following psuedo-code:

```
void fvv1(void); // computed tag value for void(void): dec888b72
void fvv2(void); // computed tag value for void(void): dec888b72
void fvv3(void); // computed tag value for void(void): dec888b72
void fvi1(int); // computed tag value for void(int): 3dc714f41
void fvi2(int); // computed tag value for void(int): 3dc714f41
void (*fptrvv1)(void); // computed tag value for void(*)(void): dec888b72
void (*fptrvv2)(void); // computed tag value for void(*)(void): dec888b72
void (*fptrvi1)(int); // computed tag value for void(*)(int): 3dc714f41
if (<condition1>){
  fptrvv1 = &fvv1;
  else
  fptrvv1 = &fvv2;
}
fptrvv1( ); // A: indirect call
if (<condition2>){
  fptrvv1 = &fvv1;
  else
  fptrvv1 = &fvv3;
}
fptrvv1( ); // B: indirect call
fptrvv2 = &fvv1;
fptrvv2( ); // C: indirect call
fptrvi1 = &fvi1;
fptrvi1( ); // D: indirect call
```

As illustrated, indirect calls A, B, C, and D are depicted using reference numbers 201, 203, 205, and 207, respectively in FIG. 2. At 201 function pointer fptrvv1 (illustrated as indirect call A) references function fvv1 at 202. Further, control flow (from the above pseudo code) can also be transferred to function fvv2, at 204, by function pointer fptrvv1. In another execution, at 203, (illustrated as indirect call B) function pointer fptrvv1 can reference function fvv2, at 204, or fvv3, at 206, depending on condition2 in the pseudo code. Further, at 205 (illustrated as indirect call C) function pointer fptrvv2 can reference function fvv1, at 202. At 207 (illustrated as indirect call D), function pointer fptrvi1 can reference to function fvi1, at 208.

In one embodiment, an approximation of an ICFG can be generated by computing the hash values of each type by declaring directed edges between indirect calls, function returns, and/or functions whose type hash values are the same, as illustrated in FIG. 2. Once a tag value for a function has been computed based on its type, in one embodiment, an approximate ICFG can be computed based on the type based computed tag values. In FIG. 2, false edges (over-approximation) are represented by dashed arrows, while directed (solid) arrows represent the correct ICFG, as represented by the pseudo code above, illustrating FIG. 2. As illustrated, since indirect call C, at 205, has the same tag value as function fvv2, at 204, and function fvv3, at 206, the TB-SA-ICFG illustrated herein can generate a false edge of the ICFG. Similarly, since indirect call D, at 207, has the same computed tag value of function fvi2, at 210, a false edge would be generated in the ICFG by the TB-SA-ICFG techniques described herein. Therefore, such an ICFG can be an over-approximation of the real ICFG since not all functions having the same type (and thus same type hash) may actually be intended targets at particular indirect control flow sites. However, the TB-SA-ICFG construct of FIG. 2, in one embodiment, can be a permissible approximation of an ICFG without whole program static analysis and other methods that in practice would not scale to large target code bases (e.g., Linux source code, Chromium browser, etc.).

In one embodiment, once the hash types are computed at the time of compilation, at runtime verification becomes a relatively simple task of comparing the type hash computed for the indirect control transfer (indirect call or function return) with the type hash stored at the target code pointer. In one embodiment, a hash function (e.g., MD or SHA families, SipHash, etc.) can be used on a bit-string to compute the tag value of the type signature of the given function or function pointer. In general, any arbitrary type encoding technique can be used as long as different types can be encoded/distinguished uniquely. Further, to reduce false edges, the TB-SA-ICFG anticipates as much information as possible from a function or function pointer data type to be included in the type signature. For example, in the C language, using the techniques described herein, the type hash can at most include the function return type and the types of each parameter (ignoring the top-level CVR qualifiers). C language constructs cannot include the names of the parameters (as they may not be available for function pointers and even if they were, different functions of the same type could very well have different names for their parameters) and the names of the functions and the function pointers (since by definition they're unique and thus the type hash would be different for otherwise same types). Similarly, in the C++ language, for computing type hashes non-class functions and static class member functions and their corresponding function pointer types behave exactly as C functions and function pointers; therefore the same considerations of C language, as described above, also apply to hashes non-class functions and static class member functions and their corresponding function pointer types of the C++ language. A person of ordinary skill in the art would appreciate that functions and their corresponding function pointers of other programming languages can have similar (or different) constraints and apply the techniques described herein accordingly. Generally, for optimal security exploit prevention, the type hash should include unique information of the type as the language rules allow and that are available to the compiler at both the indirect call sites and the function definitions themselves.

Figure 3:
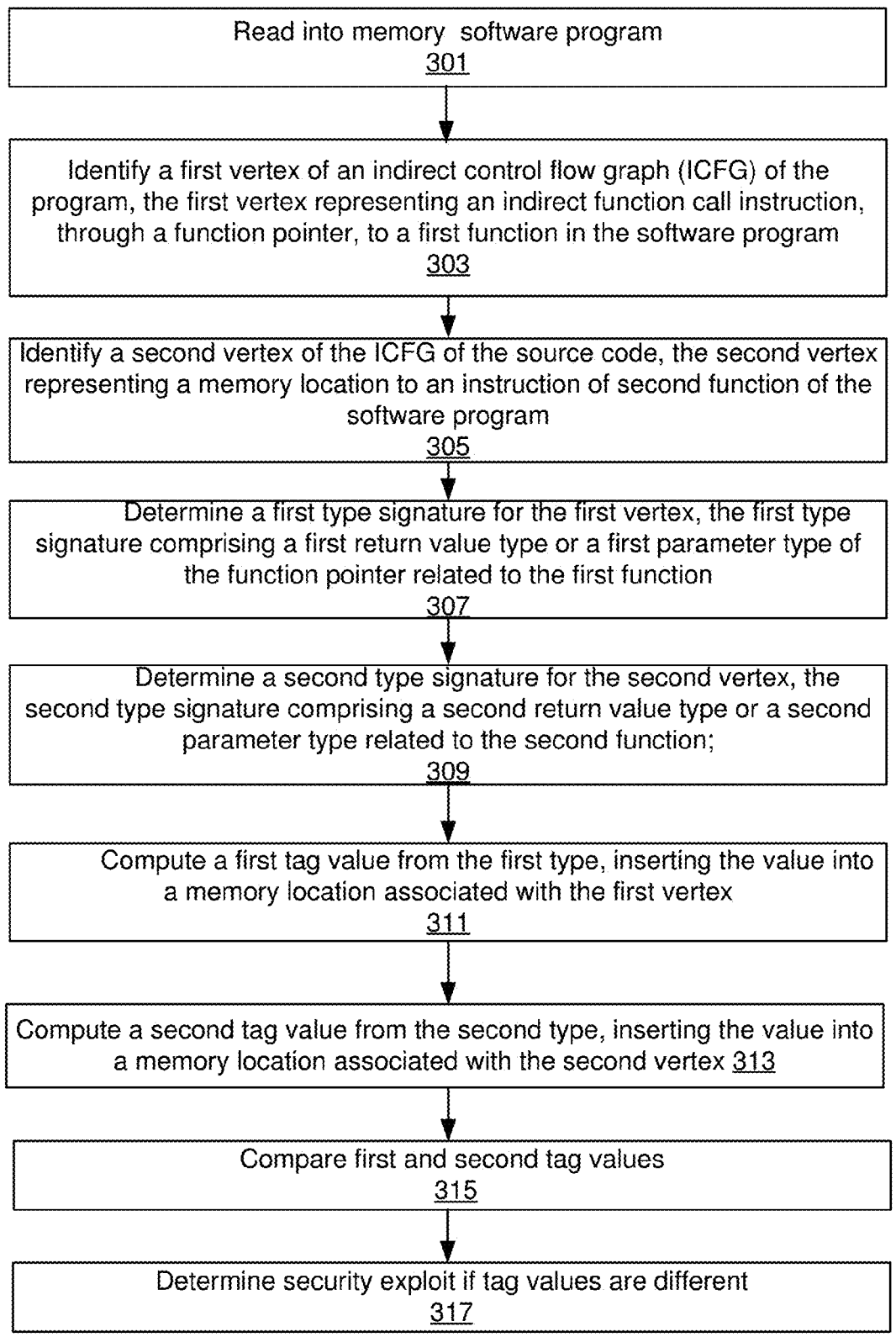
FIG. 3 illustrates a process flow graph describing the operations in identifying a security exploit using a TB-SA-ICFG, according to one embodiment of the present invention.

FIG. 3 illustrates a process flow graph describing the operations in identifying a security exploit using a TB-SA-ICFG, according to one embodiment of the present invention. At 301, the software program is read into memory. At 303, a first vertex of an ICFG of the software program is identified. In one embodiment, the first vertex is a machine instruction which at least represents an indirect function call, through a function pointer, in memory, to at least a first function in the software program. At 305, a second vertex of the ICFG of the software program is identified, the second vertex representing a memory location where another machine instruction of a second function of the software program resides in memory. At 307, a first type signature for the first vertex is determined. In one embodiment, the first type signature comprises at least a first return value type or at least a first parameter type of the function pointer related to the at least first function/ At 309, a second type signature for the second vertex is determined. In one embodiment, the second type signature includes at least a second return value type or at least a second parameter type related to the second function. At 311, at least one first tag value is computed from at least the first type. In one embodiment, the at least one first tag value is inserted into a memory location that is associated with the first vertex. As referred herein, a memory location that stores a tag value is said to be associated with a vertex if the tag value was computed for that vertex. In a preferred embodiment, the tag values associated with at least the first or second vertices can be stored at a predetermined offset memory location from the indirect function call and/or the function. In one embodiment, the predetermined offset can be determined based on the length of the tag value. For example, if the tag value is computed to be an 8 byte value, then, in one embodiment, the tag value can be injected at an 8 byte offset memory location from the function call and/or the function during compilation of the source code. At 313, at least one second tag value is computed from the second type signature. In one embodiment, the at least one second tag value is inserted into a memory location that is associated with the second vertex. At 315, the at least one first tag value and the at least one second tag value are compared during execution of the software program. At 317, a security exploit is identified when it is determined that the at least one first tag value and the at least one second tag value are different. In one embodiment, the at least first tag value and the at least second tag value are computed by at least one function that can map one or more sequences of bits of arbitrary length to a sequence of bits of bounded length. Further, in another embodiment, the at least one function is at least one of a hash function, a memory compare function, or a cyclic redundancy check function. A person of ordinary skill in the art would appreciate that any function can be used to compute the tag values. In one embodiment, the type signatures can be considered as the tag value.

Figure 4:
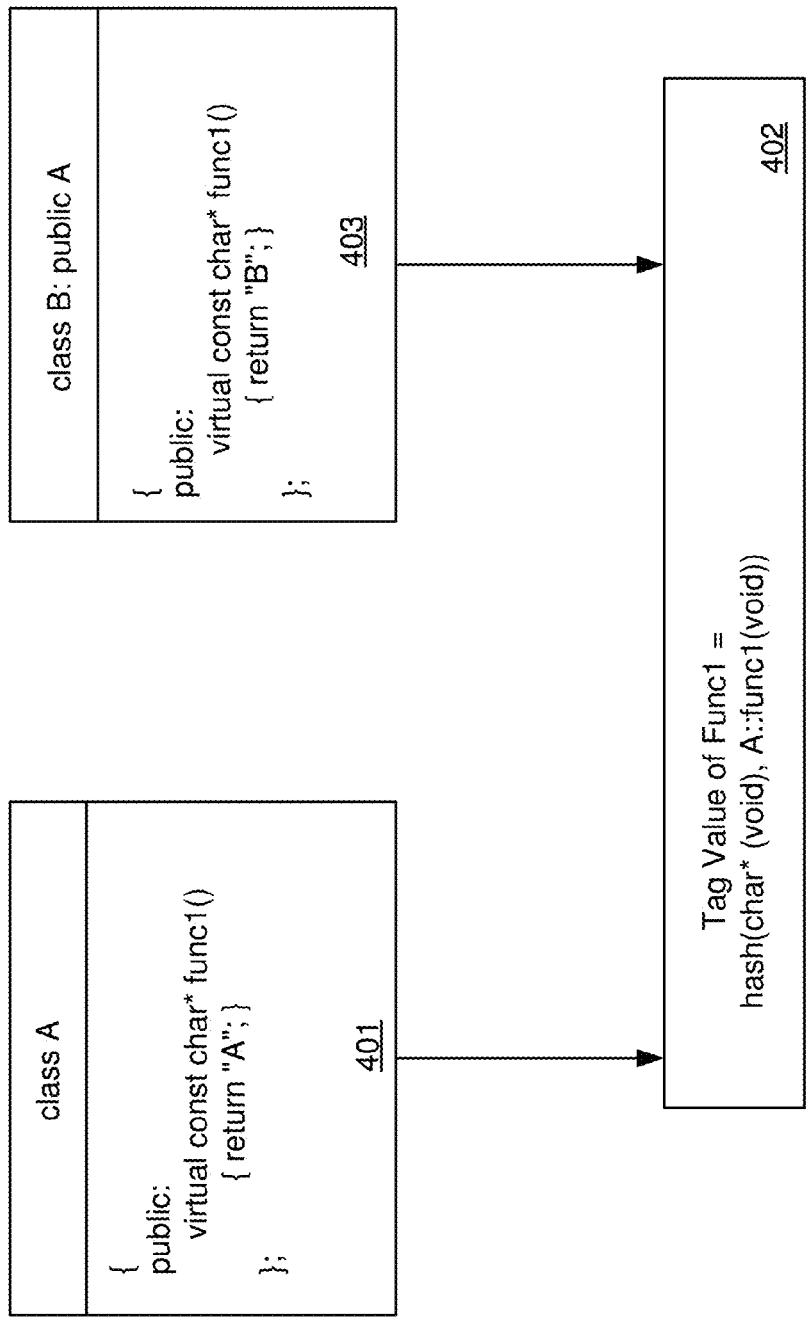
FIG. 4. illustrates a block diagram describing the type signature that can be used to compute a tag value for a virtual class member function.

FIG. 4. illustrates a block diagram describing the type signature that can be used to compute a tag value for a virtual class member function. Using, the techniques described herein, object oriented programming languages, like C++, can provide more robust security protection by reducing, if not completely eliminating, the possibility of false edges to a very high probability since class member functions (non-static) and virtual class member functions have one or more implicit parameters that are inserted by the compiler (and are not directly exposed in the source code type signature).

Furthermore, virtual class member functions can be called via indirect calls through a class member function pointer or via normal virtual member function calls. In this respect, for type hash purposes, an important implicit parameter is the 'this' parameter which is of a pointer type to a given class. Since a pointer to class member function is allowed to target both non-virtual and virtual functions with a matching source level type (i.e., the implicit parameters can be ignored) in a class hierarchy, the 'this' parameter type cannot, in general, be included in the type hash for either kind since each virtual class member function can potentially have a different 'this' type signature.

Further, object oriented languages, like the C++ language, allow type covariance for the return type of virtual class member functions, that is, in these class member functions the return type cannot be included if the type can be subject to covariance (only class pointers can). Therefore, for indirect calls to normal class member functions through a class member function pointer, the type hash can include the source level function parameter types and the return type only if it cannot be covariant. It should be noted that it is possible to compute different type hashes for otherwise matching virtual and non-virtual member functions since at the assembly level, an indirect call through a class member function pointer will be computed as two separate indirect call instructions (one for each kind of member function), and therefore the potentially different type hash values can be checked.

In object oriented languages like C++, a virtual class member function can either override a unique existing virtual class member function in one of its parent classes (thus extending the 'chain' of overridden functions of a given type in the class hierarchy) or it will start a new chain. Therefore, a second type hash can be computed (after the previously discussed case of member function pointer calls where the virtual class member function that starts the chain). Since the class hierarchy information is available to the compiler at both virtual call sites and virtual class member function definitions, the type of the base (parent) virtual class can be used to compute the type hash. Such a class is referred to as an ancestor class herein.

Since the ancestor class will be the same at all sites of interest, the type hash need no longer be constrained as it was for member function pointer calls. This allows including the 'this' parameter type and the return type along with the name of the ancestor class member function as well to compute the tag value for the type signature. This diversifies the type hash values for normal virtual member function calls (which, in practice, greatly outnumbers member function pointer calls). Therefore, in one embodiment, when addressing situations involving normal virtual member function calls, a second type hash can be computed for the ancestor class member function of a given virtual member function and verify the ancestor method at runtime. It should be noted that since the compiler can distinguish virtual member functions and calls from the other known constructs, the complier can recognize the type hash that needs to be verified at a given indirect call site; the second type hash can, in one embodiment, include each part of the type including the name of the ancestor class member function.

Referring to FIG. 4, class A, represented at 401, can be a base class of a virtual member function func1, in one embodiment. Further, class B, represented at 403, can override func1 of class A, implementing overridden virtual member function func1. Using the techniques described herein, a tag value for the function func1 of class A and class B can be computed by using the hash value of the type signature as illustrated at 402. Since class A::func1 would be determined to be the ancestor class of class B::func1, in one embodiment, the class name, A::func1, can be used to determine the type signature of class B. Similarly, since the ancestor function of class A will be the member function func1 of class A itself since it is the base class. Therefore, as illustrated at 402, the type signature for both classes, can be the same, thereby further reducing the possibility of false edges in the TB-SA-ICFG.

Figure 5:
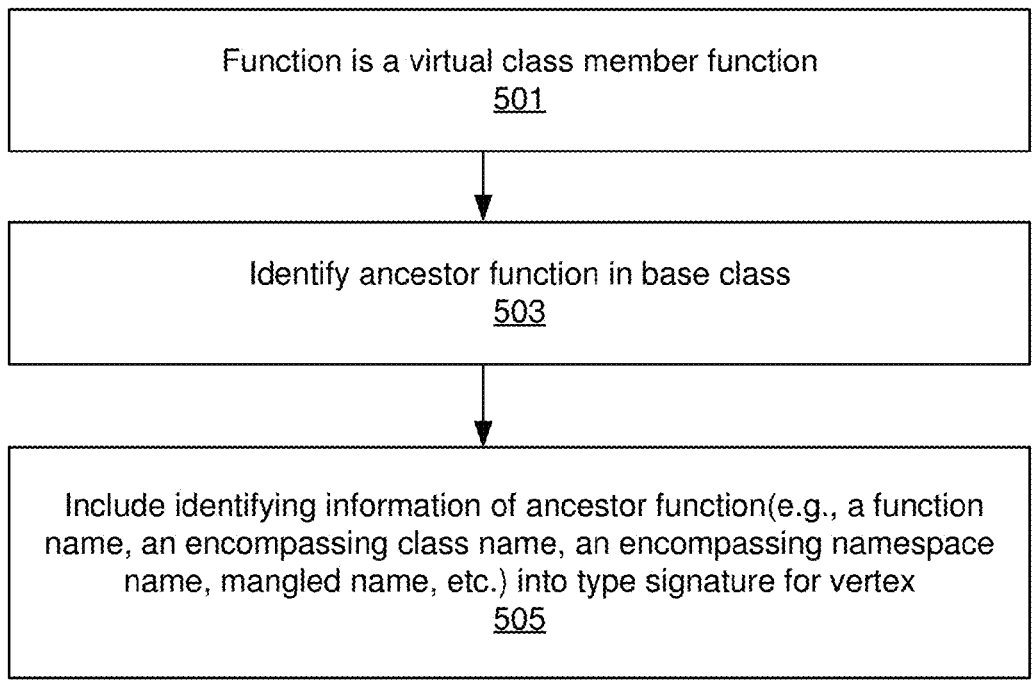
FIG. 5 illustrates a process flow graph of identifying the information that can be included in type signature for a vertex for virtual class member function, according to one embodiment of the present invention.

FIG. 5. illustrates a process flow graph of identifying the information that can be included in type signature for a vertex for virtual class member function, according to one embodiment of the present invention. As illustrated, at 501, it is determined that the function is a virtual class member function. At 503, an ancestor function in the base class of the virtual class member function is determined. In one embodiment, the ancestor function is a virtual class member function that does not override any other virtual class member function. At 505, and identifying information of the ancestor function to the type signature of the vertex representing the virtual class member function or pointer to, thereof. In one embodiment, an encompassing class of the ancestor function is a base class of the encompassing class of the virtual class member function. In another embodiment, a virtual function table index of the virtual class member function of the base class is the same as the virtual function table index of the virtual class member function. In yet another embodiment, the identifying information of the ancestor function includes at least one of a function name, an encompassing class name, an encompassing namespace name. The identifying information can further include a mangled name of the base class.

The above discussed techniques can also be implemented for function returns (backward edges verification in the ICFG). However, in the case of function returns the ancestor member function type hash cannot be used since the compiler would not know whether the given virtual member function will be called via a normal virtual call or through a class member function pointer. This can be further illustrated with the following, in assembly pseudo code:

```
fi: ; label identifying the beginning of function fi
    movq (%rsp),%rcx ; load return address from memory and store it into processor register rcx
    cmpq 2(%rcx),-0x23456789 ; compare type hash for void(int) with the type hash stored at offset 2 from the return address
    jne .attack_detected ; jump to error handling if a type hash mismatch was detected
    retq ; return from function fi
...
fv: ; label identifying the beginning of function fv
    movq (%rsp),%rcx ; load return address from memory and store it into processor register rcx
    cmpq 2(%rcx),-0x12345678 ; compare type hash for void(void) with the type hash stored at offset 2 from the return address
    jne .attack_detected ; jump to error handling if a type hash mismatch was detected
    retq ; return from function fv
...
    movq fv,%rax ; store the address of function fv into processor register rax
...
    callq *%rax ; indirect call to the address stored in processor register rax
    jmp 1f ; jump over the next instruction (type hash value) as it signifies data
    dq -0x12345678 ; type hash for void(*)(void)
    1: ; label to signify the next instruction to execute after the preceding jmp 1f instruction
...
    callq fv ; direct call to function fv
    jmp 1f ; jump over the next instruction (type hash value) as it signifies data
    dq -0x12345678 ; type hash for void(void)
    1: ; label to signify the next instruction to execute after the preceding jmp 1f instruction
```

As can be seen in the pseudo code above, in one embodiment, the type hash is stored at a fixed offset from the call instruction. Further, a negated value of the forward edge hash value can be used, as illustrated in the pseudo code above. This ensures that return sites cannot be targeted by indirect calls and that returns cannot go to the beginning of functions due to matching type hashes. In this embodiment, the type hash range would be required to be restricted to positive numbers. In another embodiment, the type hash can also be restricted to a smaller range than what can be encoded in its type by reserving certain values for special purposes. As an example, one such special case can be when the compiler can determine that a given function cannot be called indirectly at all (e.g., static functions whose address is not taken). In this case, the compiler could emit a reserved hash value instead of the real type hash which further reduces the target set of that type hash value and thus improves security. Other special cases where reserved type hash values can be used include long jmp targets and other types of landing pads used in exception handling, signal handlers, etc., as known to a person of ordinary skill in the art.

In addition to preventing CRA based security exploits, the techniques described herein can also be used for code optimization purposes. After generating a TB-SA-ICFG, using the techniques described herein, indirect call sites programs where the corresponding type hash matches a single (or two/three) function(s) can be converted into direct calls during compilation. Therefore, the type hashes computed herein can further be used to implement devirtualization to optimize the program during its compilation. By applying devirtualization based optimizations, with respect to the techniques described herein, in one embodiment, the compiler can emit a sequence of direct calls controlled by any known optimization technique to a person of ordinary skill in the art (e.g., an if-ladder based optimization technique).

Numerous techniques can be employed to compute the tag values of each function/function call, depending on its construct. A few non-limiting examples have been described further below. It should be noted, the following are examples and can be modified or combined as determined appropriate by a person of ordinary skill in the art.

For computing a tag value from the one or more parts of a type, any method can be used that maps one or more sequences of bits of arbitrary length to a sequence of bits of bounded length. In one embodiment, a method includes converting an indirect control transfer through a function pointer to a direct control transfer to a first function, the method comprising determining a type for the function pointer, computing a first tag from the type of the function pointer, determining a type for the first function, computing a second tag from the type of the first function, determining that the first tag is identical to the second tag and that only the first function has the tag in the whole program. Further, the method includes omitting or removing the one or more checks inserted by an FG-CFI method for the indirect control transfer through the function pointer wherein the indirect control transfer is converted to a direct control transfer.

In one embodiment, a method includes computing at least one tag for a first virtual class member function call by identifying an ancestor function of the first virtual class member function call, computing a type for the ancestor function, computing at least one tag from the type of the ancestor method, assigning the at least one tag to the first virtual class member function call. The method further includes identifying the ancestor function of the first virtual class member function call wherein the ancestor function of the first virtual class member function call is a second (virtual) class member function, further the second class member function does not itself override any other virtual class member function, and further the encompassing class of the second class member function is a base class of the encompassing class of the second virtual class member function is the same as the virtual function table index of the first virtual class member function call.

In one embodiment, a method includes computing at least one tag for a first virtual class member function by identifying an ancestor function of the first virtual class member function, computing a type for the ancestor function; computing at least one tag from the type of the ancestor method, assigning the at least one tag to the first virtual class member function. The method further includes identifying the ancestor function of the first virtual class member function wherein the ancestor function of the first virtual class member function is a second class member function, further the second class member function does not itself override any other virtual class member function, and further the encompassing class of the second class member function is a base class of the encompassing class of the first virtual class member function, and further the virtual function table index of the second virtual class member function is the same as the virtual function table index of the first virtual class member function.

For computing a first tag for an indirect control transfer through a non-class member function pointer such as a conventional function pointer as defined by the C language or a conventional function pointer to a non-class member function or a function pointer to a static class member function as defined by the C++ language, at least one of the following parts of the type of the non-class member function pointer may be used to compute a tag: the return value type, the type of each function parameter.

For computing a first tag for an indirect control transfer through a class member function pointer to a non-virtual function such as a conventional class member function pointer to a non-static non-virtual class member function as defined by the C++ language, one or more of the following parts of the type of the class member function parameter except the type of the implicit first parameter for the 'this' pointer.

For computing a first tag for an indirect control transfer through a class member function pointer to a virtual class member function such as a conventional class member function pointer to a non-static virtual class member function as defined by the C++ language, one or more of the following parts of the type of the class member function pointer may be used to compute a tag: the type of each function parameter except the type of the implicit first parameter for the 'this' pointer.

For computing a first tag for a first virtual class member function call such as a conventional class member function call to a non-static virtual class member function as defined by the C++ language, as a first step a second virtual class member function is determined wherein the second virtual class member function is the ancestor function of the first virtual class member function wherein the ancestor function is defined to be the class member function which does not itself override any other virtual class member function, and further whose encompassing class is a base class of the class of the first virtual class member function call, and further whose virtual function table index is the same as the virtual function table index of the first virtual class member function call. As a second step, one or more of the following parts of the type of the second virtual class member function may be used to compute a tag for the first virtual class member function call: the return type of the ancestor function, the type of each function parameter of the ancestor function including the type of the implicit first parameter for the 'this' pointer, the name of the ancestor function.

For computing a first tag for a non-class member function such as a conventional function as defined by the C language or a conventional non-class member function as defined by the C++ language or a static class member function as defined by the C++ language, one or more of the following parts of the type of the non-class member function may be used: the return value type, the type of each function parameter.

For computing a first tag for a non-virtual class member function such as a conventional non-static non-virtual class member function as defined by the C++ language, one or more of the following parts of the type of the non-virtual class member function may be used: the return value type, the type of each function parameter except the type of the implicit first parameter for the 'this' pointer.

For computing a first tag for a first virtual class member function such as a conventional non-static virtual class member function as defined by the C++ language, one or more of the following parts of the type of the first virtual class member function may be used: the type of each function parameter except the type of the implicit first parameter for the 'this' pointer.

For computing a second tag for a first virtual class member function such as a conventional non-static virtual class member function as defined by the C++ language, as a first step a second virtual class member function is determined wherein the second virtual class member function is the ancestor function of the first virtual class member function wherein the ancestor function is defined to be the class member function which does not itself override any other virtual class member function, and further whose encompassing class is a base class of the class of the first virtual class member function, and further whose virtual function table index is the same as the virtual function table index of the first virtual class member function. As a second step, one or more of the following parts of the type of the second virtual class member function may be used to compute a tag for the first virtual class member function call: the return type of the ancestor function, the type of each function parameter of the ancestor function including the type of the implicit first parameter for the 'this' pointer, the name of the ancestor function.

For computing a first tag for a function return from a non-class member function such as a conventional function as defined by the C language or a conventional non-class member function or a static class member function as defined by the C++ language, one or more of the following parts of the type of the non-class member function may be used to compute a tag: the return value type, the type of each function parameter.

For computing a first tag for a function return from a non-virtual class member function such as a conventional non-static non-virtual class member function as defined by the C++ language, one or more of the following parts of the type of the non-virtual class member function may be used: the return value type, the type of each function parameter except the type of the implicit first parameter for the 'this' pointer.

For computing a first tag for a function return from a first virtual class member function such as a conventional non-static virtual class member function as defined by the C++ language wherein the address of the first virtual class member function is taken at least once in the whole program, one or more of the following parts of the type of the first virtual class member function may be used: the type of each function parameter except the type of the implicit first parameter for the 'this' pointer.

For computing a second tag for a function return from a first virtual class member function such as a conventional non-static virtual class member function as defined by the C++ language where the address of the first virtual class member function is not taken in the whole program, as a first step a second virtual class member function is determined wherein the second virtual class member function is the ancestor function of the first virtual class member function wherein the ancestor function is defined to be the class member function which does not itself override any other virtual class member function, and further whose encompassing class is a base class of the class of the first virtual class member function, and further whose virtual function table index is the same as the virtual function table index of the first virtual class member function. As a second step, one or more of the following parts of the type of the second virtual class member function may be used to compute a tag for the function return from the first virtual class member function: the return type of the ancestor function, the type of each function parameter of the ancestor function including the type of the implicit first parameter for the 'this' pointer, the name of the ancestor function.

For computing a first tag for a function return place corresponding to a call to a non-class member function such as a conventional function as defined by the C language or a conventional non-class member function or a static class member function as defined by the C++ language, one or more of the following parts of the type of the non-class member function may be used to compute a tag: the return value type, the type of each function parameter.

For computing a first tag for a function return place corresponding to a call to a non-virtual class member function such as a conventional non-static non-virtual parts of the type of the non-virtual class member function may be used: the return value type, the type of each function parameter except the type of the implicit first parameter for the 'this' pointer.

For computing a first tag for a function return place corresponding to a call to a first virtual class member function such as a conventional non-static virtual class member function as defined by the C++ language wherein the address of the first virtual class member function is taken at least once in the whole program, one or more of the following parts of the type of the first virtual class member function may be used: the type of each function parameter except the type of the implicit first parameter for the 'this' pointer.

For computing a second tag for a function return place corresponding to a call to a first virtual class member function such as a conventional non-static virtual class member function as defined by the C++ language where the address of the first virtual class member function is not taken in the whole program, as a first step a second virtual class member function is determined wherein the second virtual class member function is the ancestor function of the first virtual class member function wherein the ancestor function is defined to be the class member function which does not itself override any other virtual class member function, and further whose encompassing class is a base class of the class of the first virtual class member function, and further whose virtual function table index is the same as the virtual function table index of the first virtual class member function. As a second step, one or more of the following parts of the type of the second virtual class member function may be used to compute a tag for the function return place ancestor function, the type of each function parameter of the ancestor function including the type of the implicit first parameter for the 'this' pointer, the name of the ancestor function.

Table 1 summarizes the parts of the type of functions and function pointers to compute a tag value. A 'Yes' indicates the part may be used to compute the tag value; a 'No' indicates the part may not be used to compute the tag value; 'N/A' indicates the part is not available (or not applicable) for the respective function/function call.

TABLE 1

|  | Return Type | Name | 'this' Parameter | Other Parameters |
|---|---|---|---|---|
| Pointer to Non-Class Member Function or Static Class Member Function | Yes | No | N/A | Yes |
| Class Member Function Pointer to Non-virtual Class Member Function | Yes | No | No | Yes |
| Class Member Function Pointer to Virtual Class Member Function | No | No | No | Yes |
| Virtual Class Member Function Call (ancestor function) | Yes | Yes | Yes | Yes |
| Non-Class Member Function or Static Class Member Function | Yes | No | N/A | Yes |
| Non-Virtual Class Member Function | Yes | No | No | Yes |
| Virtual Class Member Function | No | No | No | Yes |
| Virtual Class Member Function (Ancestor function) | Yes | Yes | Yes | Yes |

Table 2 summarizes the parts of the type of function returns and return places to compute a tag value. A 'Yes' indicates the part may be used to compute the tag value; a 'No' indicates the part may not be used to compute the tag value; 'N/A' indicates the part is not available (or not applicable) for the respective function/function call.

TABLE 2

|  | Return Type | Name | 'this' Parameter | Other Parameters |
|---|---|---|---|---|
| Function Return from Non-Class Member Function or Static Class Member Function | Yes | No | N/A | Yes |
| Function Return from Non-virtual Class Member Function | Yes | No | No | Yes |
| Function Return from Virtual Class Member Function if Address Taken | No | No | No | Yes |
| Function Return from Virtual Class Member Function if Address Not Taken (ancestor function) | Yes | Yes | Yes | Yes |
| Function Return Place Corresponding to Call to Non-Class Member Function or Static Class Member Function | Yes | No | N/A | Yes |
| Function Return Place Corresponding to Call to Non-virtual Class Member Function | Yes | No | No | Yes |

TABLE 2-continued

| | Return Type | Name | 'this' Parameter | Other Parameters |
|---|---|---|---|---|
| Function Return Place Corresponding to Call to Virtual Class Member Function if Address Taken | No | No | No | Yes |
| Function Return Place Corresponding to Call to Virtual Class Member Function if Address Not Taken (ancestor function) | Yes | Yes | Yes | Yes |

For computing a tag value from one or more parts of a type, any method can be used that maps one or more sequences of bits of arbitrary length to a sequence of bits of bounded length. An example embodiment describes a mapping function that computes a message digest from a string representation of a type and produces a tag value from the output of the message digest method. A person having ordinary skill in the art would appreciate that any other message digest or other similar method can be used to produce a tag value for a type.

The techniques shown in the figures can be implemented using computer program instructions (computer code) and data stored and executed on one or more electronic systems (e.g., computer systems, etc.). Such electronic systems store and communicate (internally and/or with other electronic systems over a network) code and data using machine-readable media, such as machine-readable non-transitory storage media (e.g., magnetic disks; optical disks; random access memory; dynamic random access memory; read only memory; flash memory devices; phase-change memory). In addition, such electronic systems typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device.

It should be apparent from this description that aspects of the present invention may be embodied, at least in part, in software. That is, the techniques may be carried out in a computer system or other computer system in response to its processor, such as a microprocessor, executing sequences of instructions contained in memory, such as a ROM, DRAM, mass storage, or a remote storage device. In various embodiments, hardware circuitry may be used in combination with software instructions to implement the present invention. Thus, the techniques are not limited to any specific combination of hardware circuitry and software nor to any particular source for the instructions executed by the computer system. In addition, throughout this description, various functions and operations are described as being performed by or caused by software code to simplify description. However, those skilled in the art will recognize what is meant by such expressions is that the functions result from execution of the code by a processor.

Figure 6:
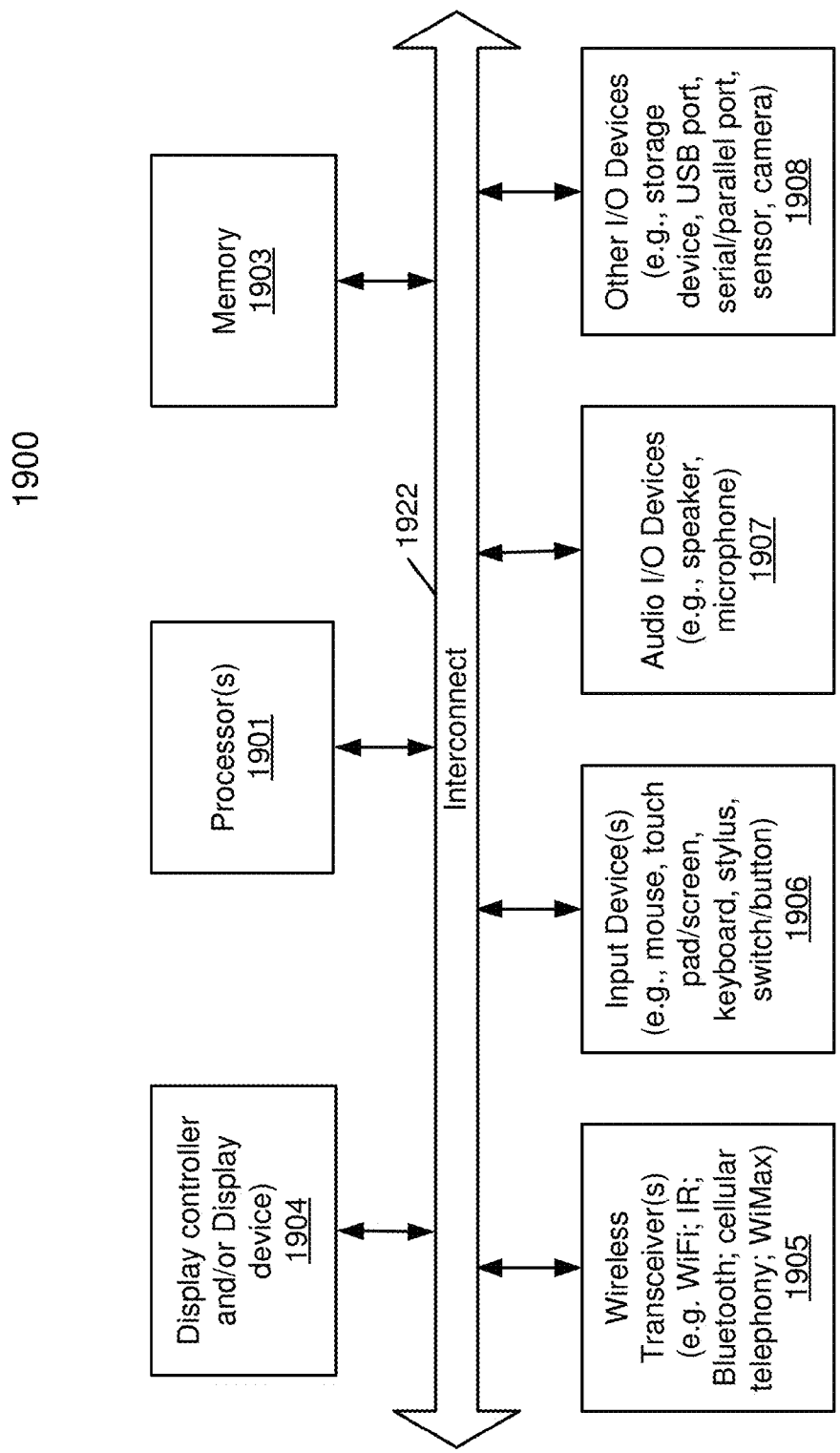
FIG. 6 illustrates a block diagram illustrating a data processing system such as a computing system which can be used with one embodiment of the present invention.

FIG. 6 is a block diagram illustrating a data processing system such as a computing system 1900 which may be used with one embodiment of the invention. For example, system 1900 may be implemented as part of a system to identify security exploits and/or optimize software code by generating a type based self-assembling indirect control flow graph. In one embodiment, system 1900 may represent system 100 implementing a TB-SA-ICFG engine 102. System 1900 may have a distributed architecture having dispersed units coupled through a network, or all of its components may be integrated into a single unit.

For example, computing system 1900 may represents any of data processing systems described above performing any of the processes or methods described above. System 1900 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1900 is intended to show a high level view of many components of the computer system. However, it is to be understood that additional or fewer components may be present in certain implementations and furthermore, different arrangement of the components shown may occur in other implementations. System 1900 may represent a desktop, a laptop, a tablet, a server, a mobile phone, a programmable logic controller, a personal digital assistant (PDA), a personal communicator, a network router or hub, a wireless access point (AP) or repeater, a set-top box, or a combination thereof.

In one embodiment, system 1900 includes processor 1901, memory 1903, and devices 1905-1908 via a bus or an interconnect 1922. Processor 1901 may represent a single processor or multiple processors with a single processor core or multiple processor cores included therein. Processor 1901 may represent one or more general-purpose processors such as a microprocessor, a central processing unit (CPU), or the like. More particularly, processor 1901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1901 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1901, which may be a low power multi-core processor socket such as an ultra low voltage processor, may act as a main processing unit and central hub for communication with the various components of the system. Such processor can be implemented as a system on chip (SoC). In one embodiment, processor 1901 may be an Intel® Architecture Core™-based processor such as an i3, i5, i19 or another such processor available from Intel Corporation, Santa Clara, Calif. However, other low power processors such as available from Advanced Micro Devices, Inc. (AMD) of Sunnyvale, Calif., an ARM-based design from ARM Holdings, Ltd. or a MIPS-based design from MIPS Technologies, Inc. of Sunnyvale, Calif., or their licensees or adopters may instead be present in other embodiments.

Processor 1901 is configured to execute instructions for performing the operations and methods discussed herein. System 1900 further includes a graphics interface that communicates with graphics subsystem 1904, which may include a display controller and/or a display device.

Processor 1901 may communicate with memory 1903, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 207-2E (published April 2007), or a next generation LPDDR standard to be referred to as LPDDR3 that will offer extensions to LPDDR2 to increase bandwidth. As examples, 2/4/8 gigabytes (GB) of system memory may be present and can be coupled to processor 1901 via one or more memory interconnects. In various implementations the individual memory devices can be of different package types such as single die package (SDP), dual die package (DDP) or quad die package (QDP). These devices can in some embodiments be directly soldered onto a motherboard to provide a lower profile solution, while in other embodiments the devices can be configured as one or more memory modules that in turn can couple to the motherboard by a given connector.

Memory 1903 can be a machine readable non-transitory storage medium such as one or more volatile storage (or memory) devices such as random access memory (RAM), dynamic RAM (DRAM), synchronous DRAM (SDRAM), static RAM (SRAM), or other types of storage devices such as hard drives and flash memory. Memory 1903 may store information including sequences of executable program instructions that are executed by processor 1901, or any other device. For example, executable code and/or data of a variety of operating systems, device drivers, firmware (e.g., input output basic system or BIOS), and/or applications can be loaded in memory 1903 and executed by processor 1901. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1900 may further include IO devices such as devices 1905-1908, including wireless transceiver(s) 1905, input device(s) 1906, audio IO device(s) 19019, and other IO devices 1908. Wireless transceiver 1905 may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, network interfaces (e.g., Ethernet interfaces) or a combination thereof.

Input device(s) 1906 may include a mouse, a touch pad, a touch sensitive screen (which may be integrated with display device 1904), a pointer device such as a stylus, and/or a keyboard (e.g., physical keyboard or a virtual keyboard displayed as part of a touch sensitive screen). For example, input device 1906 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio IO device 1907 may include a speaker and/or a microphone to facilitate voice-enabled functions, such as voice recognition, voice replication, digital recording, and/or telephony functions. Other optional devices 1908 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Optional devices 1908 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1907 via a sensor hub (not shown), while other devices such as a keyboard or thermal sensor may be controlled by an embedded controller (not shown), dependent upon the specific configuration or design of system 1900.

To provide for persistent storage of information such as data, applications, one or more operating systems and so forth, a mass storage (not shown) may also couple to processor 1901. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on RE-initiation of system activities. Also a flash device may be coupled to processor 1901, e.g., via a serial peripheral interface (SPI). This flash device may provide for non-volatile storage of system software, including a basic input/output software (BIOS) as well as other firmware of the system.

Note that while system 1900 is illustrated with various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Thus, methods, apparatuses, and computer readable medium to systems and methods to identify security exploits by generating a type based self-assembling indirect control flow graph. In another embodiment, the techniques described herein can also be used to optimize a software program. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

The invention claimed is:

1. A method to identify a security exploit in a software program implemented by a computer system comprising one or more processors, comprising:
during at least one of compilation, runtime dynamic binary instrumentation, runtime code generation, static binary rewriting, or binary translation of the software program:
reading, by the one or more processors, into memory, the software program, identifying, by the one or more processors, a first vertex of an indirect control flow graph (ICFG) of the software program, wherein the first vertex is a machine instruction which at least represents an indirect function call, through a function pointer, in memory, to a first function in the software program, identifying, by the one or more processors, a second vertex of the ICFG of the software program, wherein the second vertex represents a memory location where another machine instruction of a second function of the software program resides in memory, determining, by the one or more processors, a first type signature for the first vertex, wherein the first type signature comprises a first return value type or a first parameter type of the function pointer related to the first function, determining, by the one or more processors, a second type signature for the second vertex, wherein the second type signature comprises a second return value type or a second parameter type related to the second function, computing, by the one or more processors, at least one first tag value from the first type signature;

inserting, by the one or more processors, the at least one first tag value into a first memory location, the first memory location associated with the first vertex of the ICFG, the first tag value representing the indirect function call to the first function, computing, by the one or more processors, at least one second tag value from the second type signature, and inserting, by the one or more processors, the at least one second tag value into a second memory location, the second memory location associated with the second vertex of the ICFG, the second tag value representing the second function; and during execution of the software program:
reading, by the one or more processors, the first and second tag values,
comparing, by the one or more processors, the at least one first tag value and the at least one second tag value, and
based on the comparing, when it is determined that the at least one first tag value is different from the at least one second tag value, determining that the second function is not the intended target of the indirect function call, thereby identifying the security exploit.

2. The method of claim 1, wherein when it is determined that the first function is a first virtual class member function, the method further comprises:
identifying, by the one or more processors, a first ancestor function of the first function, and wherein the first ancestor function is a second virtual class member function, and wherein the first ancestor function does not override any other virtual class member function; and
including identifying information of the first ancestor function to the first type signature.

3. The method of claim 1, wherein when it is determined that the second function is a second virtual class member function, the method further comprises:
identifying, by the one or more processors, a second ancestor function of the second function, and wherein the second ancestor function is a third virtual class member function, and wherein the second ancestor function does not override any other virtual class member function; and
including identifying information of the second ancestor function to the second type signature.

4. The method of claim 2, wherein an encompassing class of the first ancestor function is a base class of the encompassing class of the first virtual class member function, and wherein a virtual function table index of the second virtual class member function is the same as the virtual function table index of the first virtual class member function.

5. The method of claim 2, wherein the identifying information of the first ancestor function includes at least one of a function name, an encompassing class name, an encompassing namespace name.

6. The method of claim 2, wherein the identifying information of the first ancestor function includes a mangled name.

7. The method of claim 1, wherein the at least first tag value and the at least second tag value are computed by at least one function that can map one or more sequences of bits of arbitrary length to a sequence of bits of bounded length.

8. The method of claim 7, wherein the at least one function is at least one of a hash function, a memory compare function, or a cyclic redundancy check function.

9. A non-transitory computer readable medium comprising instructions which when executed by a processing system comprising one or more cores, executed a method to identify a security exploit in a software program, comprising:
during at least one of compilation, runtime dynamic binary instrumentation, runtime code generation, static binary rewriting, or binary translation of the software program:
reading, into memory, the software program,
identifying a first vertex of an indirect control flow graph (ICFG) of the software program, wherein the first vertex is a machine instruction which at least represents an indirect function call, through a function pointer, in memory, to a first function in the software program,
identifying a second vertex of the ICFG of the software program, wherein the second vertex represents a memory location where another machine instruction of a second function of the software program resides in memory,
determining a first type signature for the first vertex, wherein the first type signature comprises a first return value type or a first parameter type of the function pointer related to the first function,
determining a second type signature for the second vertex, wherein the second type signature comprises a second return value type or a second parameter type related to the second function,
computing at least one first tag value from the first type signature,
inserting the at least one first tag value into a first memory location, the first memory location associated with the first vertex of the ICFG, the first tag value representing the indirect function call to the first function,
computing at least one second tag value from the second type signature, and
inserting the at least one second tag value into a second memory location, the second memory location associated with the second vertex of the ICFG, the second tag value representing the second function; and
during execution of the software program:
reading the first and second tag values,
comparing the at least one first tag value and the at least one second tag value, and
based on the comparing, when it is determined that the at least one first tag value is different from the at least one second tag value, determining that the second function is not the intended target of the indirect function call, thereby identifying the security exploit;

wherein the method is performed by the processing system.

10. The non-transitory computer readable medium of claim 9, wherein when it is determined that the first function is a first virtual class member function, the method further comprises:

identifying a first ancestor function of the first function, and wherein the first ancestor function is a second virtual class member function, and wherein the first ancestor function does not override any other virtual class member function; and including identifying information of the first ancestor function to the first type signature.

11. The non-transitory computer readable medium of claim 9, wherein when it is determined that the second function is a second virtual class member function, the method further comprises:

identifying a second ancestor function of the second function, and wherein the second ancestor function is a third virtual class member function, and wherein the second ancestor function does not override any other virtual class member function; and including identifying information of the second ancestor function to the second type signature.

12. The non-transitory computer readable medium of claim 11, wherein an encompassing class of the second ancestor function is a base class of the encompassing class of the second virtual class member function, and wherein a virtual function table index of the second virtual class member function is the same as the virtual function table index of the third virtual class member function.

13. The non-transitory computer readable medium of claim 11, wherein the identifying information of the second ancestor function includes at least one of a function name, an encompassing class name, an encompassing namespace name.

14. The non-transitory computer readable medium of claim 11, wherein the identifying information of the second ancestor function includes a mangled name.

15. The non-transitory computer readable medium of claim 9, wherein the at least first tag value and the at least second tag value are computed by at least one function that can map one or more sequences of bits of arbitrary length to a sequence of bits of bounded length.

16. The non-transitory computer readable medium of claim 15, wherein the at least one function is at least one of a hash function, a memory compare function, or a cyclic redundancy check function.

17. A system to identify a security exploit in a software program, comprising:

a memory device;

a processing system including one or more processors, the processing system coupled to the memory device, the processing system configured to:

during at least one of compilation, runtime dynamic binary instrumentation, runtime code generation, static binary rewriting, or binary translation of the software program:

read, into memory, the software program, identify a first vertex of an indirect control flow graph (ICFG) of the software program, wherein the first vertex is a machine instruction which at least represents an indirect function call, through a function pointer, in memory, to a first function in the software program, identify a second vertex of the ICFG of the software program, wherein the second vertex represents a memory location where another machine instruction of a second function of the software program resides in memory, determine a first type signature for the first vertex, wherein the first type signature comprises a first return value type or a first parameter type of the function pointer related to the first function, determine a second type signature for the second vertex, wherein the second type signature comprises a second return value type or a second parameter type related to the second function, compute at least one first tag value from the first type signature, insert the at least one first tag value into a first memory location, the first memory location associated with the first vertex of the ICFG, the first tag value representing the indirect function call to the first function, compute at least one second tag value from the second type signature, and insert the at least one second tag value into a second memory location, the second memory location associated with the second vertex of the ICFG, the second tag value representing the second function; and during execution of the software program:

read the first and second tag values, compare the at least one first tag value and the at least one second tag value, and when it is determined, based on the compare, that the at least one first tag value is different from the at least one second tag value, determining that the second function is not the intended target of the indirect function call, thereby identifying the security exploit.

18. The system of claim 17, wherein when it is determined that the first function is a first virtual class member function, the processing system is further configured to:

identify a first ancestor function of the first function, and wherein the first ancestor function is a second virtual class member function, and wherein the first ancestor function does not override any other virtual class member function; and include identifying information of the first ancestor function to the first type signature.

19. The system of claim 17, wherein when it is determined that the second function is a second virtual class member function, the processing system is further configured to:

identify a second ancestor function of the second function, and wherein the second ancestor function is a third virtual class member function, and wherein the second ancestor function does not override any other virtual class member function; and include identifying information of the second ancestor function to the second type signature.

20. The system of claim 18, wherein an encompassing class of the first ancestor function is a base class of the encompassing class of the first virtual class member function, and wherein a virtual function table index of the second virtual class member function is the same as the virtual function table index of the first virtual class member function.

21. The system of claim 18, wherein the identifying information of the first ancestor function includes at least one of a function name, an encompassing class name, an encompassing namespace name.

22. The system of claim 18, wherein the identifying information of the first ancestor function includes a mangled name.

23. The system of claim 17, wherein the at least first tag value and the at least second tag value are computed by at least one function that can map one or more sequences of bits of arbitrary length to a sequence of bits of bounded length.

24. The system of claim 23, wherein the at least one function is at least one of a hash function, a memory compare function, or a cyclic redundancy check function.

* * * * *

UNITED STATES PATENT AND TRADEMARK OFFICE
CERTIFICATE OF CORRECTION

| | | |
|---|---|---|
| PATENT NO. | : 9,767,292 B2 | Page 1 of 1 |
| APPLICATION NO. | : 15/289500 | |
| DATED | : September 19, 2017 | |
| INVENTOR(S) | : János Baji-Gál | |

It is certified that error appears in the above-identified patent and that said Letters Patent is hereby corrected as shown below:

In the Specification

Column 1, Line 58, - FG-CFI is the state of also - should be changed to -- FG-CFI is a defense mechanism against code reuse attacks also --

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*